(12) United States Patent
Muirhead

(10) Patent No.: US 11,021,253 B2
(45) Date of Patent: Jun. 1, 2021

(54) SOFTWARE AND COMMUNICATIONS SYSTEM AND METHOD IN AN AIRCRAFT

(71) Applicant: LUFTHANSA TECHNIK AG, Hamburg (DE)

(72) Inventor: Andrew Muirhead, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 852 days.

(21) Appl. No.: 14/432,395

(22) PCT Filed: Sep. 26, 2013

(86) PCT No.: PCT/EP2013/070114
§ 371 (c)(1),
(2) Date: Mar. 30, 2015

(87) PCT Pub. No.: WO2014/049076
PCT Pub. Date: Apr. 3, 2014

(65) Prior Publication Data
US 2015/0242765 A1    Aug. 27, 2015

(30) Foreign Application Priority Data

Sep. 28, 2012 (DE) .................. 10 2012 217 795.7

(51) Int. Cl.
*B64D 11/00*    (2006.01)
*B64D 11/06*    (2006.01)
(Continued)

(52) U.S. Cl.
CPC .... *B64D 11/00155* (2014.12); *B64D 11/0015* (2013.01); *B64D 11/00151* (2014.12);
(Continued)

(58) Field of Classification Search
CPC ............................ B64D 11/0015; G06Q 10/02
See application file for complete search history.

(56) References Cited

U.S. PATENT DOCUMENTS 6,990,335 B1 *  1/2006  Shamoon ............... G01D 21/00
                                                          455/419
8,170,535 B1 *  5/2012  Lopes ................. H04N 21/2146
                                                        455/414.1
(Continued)

FOREIGN PATENT DOCUMENTS

DE        103 47 387 A1    5/2005
WO    WO-2000/014987       3/2000
WO    WO-2009/000858      12/2008

OTHER PUBLICATIONS

In-Flight Entertainment System: State of the Art and Research Directions Published by Second International Workshop on Semantic Media Adaptation and Personalization (Year: 2007).*
(Continued)

*Primary Examiner* — Jeff Zimmerman
*Assistant Examiner* — Zeina Elchanti
(74) *Attorney, Agent, or Firm* — Saliwanchik, Lloyd & Eisenschenk

(57) ABSTRACT

The invention concerns a communications system and a communications method and software for passengers in an aircraft. The aircraft comprises an aircraft-supported data-processing arrangement and at least one on-board communications interface for communication with a passenger appliance, the communications system being arranged to receive a passenger profile from the passenger appliance by means of the communications interface of the aircraft and transmitting it to the data-processing arrangement.

18 Claims, 1 Drawing Sheet

(51) Int. Cl.
G06Q 10/02 (2012.01)
G06Q 20/32 (2012.01)
(52) U.S. Cl.
CPC ......... B64D 11/0624 (2014.12); G06Q 10/02 (2013.01); G06Q 20/3278 (2013.01)

(56) References Cited

U.S. PATENT DOCUMENTS

| | | | |
|---|---|---|---|
| 2005/0159151 A1 | 7/2005 | Eckelt | |
| 2005/0216938 A1* | 9/2005 | Brady, Jr. | H04N 7/17318 725/76 |
| 2006/0141930 A1 | 6/2006 | Keen et al. | |
| 2008/0141315 A1* | 6/2008 | Ogilvie | G06F 3/0488 725/77 |
| 2009/0049119 A1* | 2/2009 | Marcinkiewicz | H04L 67/06 709/203 |
| 2009/0077594 A1* | 3/2009 | Milosevski | H04L 67/06 725/76 |
| 2009/0112377 A1 | 4/2009 | Schalla et al. | |
| 2010/0048192 A1* | 2/2010 | Jones | H04M 1/2745 16 455/418 |
| 2010/0167716 A1 | 7/2010 | Howarter | |
| 2010/0217458 A1* | 8/2010 | Schweiger | B64D 11/00155 701/3 |
| 2011/0065375 A1* | 3/2011 | Bradley | H04M 1/72577 455/1 |
| 2011/0090064 A1 | 4/2011 | Dahms et al. | |
| 2011/0257834 A1 | 10/2011 | Hebb | |
| 2014/0065954 A1* | 3/2014 | Ovens | G08G 5/0021 455/41.1 |
| 2014/0242910 A1* | 8/2014 | Umlauft | H04W 4/008 455/41.1 |
| 2015/0109150 A1* | 4/2015 | Macrae | B64D 43/00 340/945 |

OTHER PUBLICATIONS

Hintze, H., et al., "Digitization of Processes for a Consistently Harmonized Security and Service Concept in Air Transportation," Workshop on Aircraft System Technology, 2011, pp. 201-210.
First Office Action from corresponding European Patent Office Application No. 13 770 476.3-1958, dated Feb. 11, 2016, in which references U1 and F1 in the European Patent Office.

* cited by examiner

SOFTWARE AND COMMUNICATIONS SYSTEM AND METHOD IN AN AIRCRAFT

CROSS-REFERENCE TO RELATED APPLICATIONS

The present application is the U.S. National Stage Application of International Patent Application No. PCT/EP2013/070114, filed on Sep. 26, 2013, which claims priority to German Patent Application No. 10 2012 217 795.7, filed on Sep. 28, 2012, both of which are hereby incorporated by reference herein in their entirety, including any figures, tables, or drawings.

The invention relates to software for a mobile passenger device, a communication system for passengers in an aircraft with a data-processing unit on board the aircraft and at least one on-board communication interface for communicating with a passenger device and a communication method in an aircraft with a data-processing unit on board the aircraft and at least one passenger device in the aircraft.

Airlines carry passengers in aircraft, wherein, in addition to the pure transportation of the passengers, the provision of services and the services that are provided during the flight in particular contribute to the passenger's opinion of the airline. The provision of services and the services provided can include being looked after personally by the cabin crew, an in-flight entertainment system with various media offerings, advertising and/or opportunities to purchase various items.

The cabin crew generally do not know the passengers personally, and so the cabin crew can only provide service tailored to the respective passengers after appropriate conversations and questions. This is difficult due to the limited number of the cabin crew and the typical seating arrangement in rows, since finding the time for conversations, in particular finding a common language, and having conversations over the heads of several passengers, e.g. with passengers seated in window seats, is difficult and additionally is often perceived to be awkward for the passengers seated in-between.

The object of the invention is therefore to provide a communication system and a communication method in an aircraft and corresponding software which overcome the above-mentioned disadvantages.

The object of the invention is achieved, proceeding from the preamble of claim 1, by the characterising features of said claim. Software is proposed for a mobile passenger device, which software controls the passenger device for carrying out the following step in the passenger device: transmitting a passenger profile from the passenger device to a data-processing unit in an aircraft via an on-board communication interface.

The passenger profile is a personalised record which can contain relevant data for the provision of services in an aircraft. The passenger profile can include e.g. the nationality or preferred language, dietary requirements, such as e.g. vegetarian or vegan, taste in music and/or further information useful for providing an improved service on board the aircraft.

A passenger device is a mobile, electronic device, which can be e.g. a mobile telephone, smartphone, tablet PC and/or laptop, wherein the device belongs to the respective passenger and is brought with said passenger during the journey or flight. The passenger device can be operated by the passenger during the flight at the passenger's seat.

The software or application can be installed or set up on the passenger device in such a way that the communication units of the passenger device can be controlled by the software, wherein by means of this controlling of the passenger device a passenger profile can be transmitted to the systems on the aircraft, more particularly to a data-processing unit in the aircraft.

The data-processing unit can be a computer or server in the aircraft which receives and stores the corresponding passenger profiles and makes them usable for providing on-board services.

The passenger profile is transmitted from the passenger device to the data-processing unit via an on-board communication interface, and so the usage of the passenger profile for providing services can occur entirely in the aircraft without influences from outside, which significantly increases reliability. The on-board communication interface enables a transmission of data from the communication units of the passenger device to the data-processing unit, and so a connection can be established between a passenger's mobile passenger device and an on-board system. The communication interface can comprise a near-field communication interface and/or a wired data network and/or a wireless data network.

Preferably, the software controls retrieving the passenger profile from a memory of the passenger device. The passenger profile can, in particular, be created or filled out by the passenger him/herself before the flight with the aid of the software, wherein the passenger profile can be stored on the passenger device, i.e. the personalised data from the passenger device are stored in the hardware of the passenger device. If the passenger is in the aircraft with his/her passenger device, the passenger profile is retrieved from the memory or the hardware of the passenger device by the software and can then be transmitted to the data-processing unit.

Alternatively or additionally, the software controls retrieving the passenger profile from a database on the ground into the passenger device in an advantageous manner. The passenger profile can be deposited or stored in a database on the ground on a server which can be reached via the Internet, and so the passenger profile is available to the passenger independently of a specific passenger device.

In a preferred embodiment, the software enables the passenger profile to be modified. The modifications to the passenger profile include modifying details that have already been entered and/or adding further information, which preferably is also made possible by the software on the passenger device while the passenger is on board the aircraft. The passenger can therefore enter details according to his/her current mood and modify his/her passenger profile correspondingly.

Preferably, a transmission of the modified passenger profile to the data-processing unit is requested or initiated when the passenger profile is modified. This enables the passenger profile in the data-processing unit on the aircraft to be updated immediately, and so the current passenger profile is available there promptly after a modification of the passenger profile on the passenger device by the passenger. The request enables the passenger to decide whether the modifications entered should be transmitted, wherein the passenger is simultaneously reminded of the possibility and the advantageous nature of the transmission.

Furthermore, the software preferably controls the passenger device for carrying out the following steps in the passenger device. In a first step, a procedure for connecting the passenger device to the on-board communication interface of the aircraft is identified, wherein the communication interface comprises a near-field communication interface and/or a wired data network and/or a wireless data network. In a second step, after the procedure for connecting to the on-board communication interface is identified, the passenger profile is automatically transmitted to the data-processing unit of the aircraft via the on-board communication interface.

A connection procedure can be a wired and/or wireless connection of the passenger device to the on-board communication interface of the aircraft, wherein the software identifies a procedure for connecting the communication unit of the passenger device to an external system and additionally, by means of a corresponding transmission of an identifier or an identifying feature from an on-board communication interface to the passenger device, identifies the procedure for connecting to a corresponding on-board communication interface of a corresponding aircraft and can therefore differentiate said procedure from a procedure for connecting to an arbitrary external system. After the identification, the passenger profile is transmitted automatically, and so the passenger profile for a tailored and improved on-board service is available immediately after the connection procedure. For the passenger, connecting his/her passenger device to a corresponding interface on board the aircraft can therefore be sufficient to receive an improved service in the aircraft tailored to the information stored in the passenger profile.

In an advantageous embodiment, the software controls the passenger device after identifying the on-board communication interface in order to display a specific graphical user interface on the passenger device. The graphical user interface can, for example, contain information for the passenger regarding the connection to the systems on board the aircraft and can additionally display and/or offer further possibilities for the passenger, such as internet access for the passenger device via the on-board systems on the aircraft. Furthermore, the passenger profile can be displayed on the user interface, which also allows the passenger to evaluate or note the services directly.

Preferably, the software controls the passenger device for carrying out the following steps in the passenger device, wherein, in a first step, a control signal is received from the data-processing unit of the aircraft and, in a second step, all wireless transmitters of the passenger device are switched off as a result of receiving the control signal. Aviation regulations limit the operation of passengers' electrical devices for safety reasons in critical phases of the flight, such as take-off, landing or taxiing. Active wireless operation is not permitted during these phases of the flight due to possible interaction with safety-relevant aircraft systems, and so passengers accordingly switch off their passenger devices or deactivate the corresponding functions of the passenger devices. When such a critical phase of the flight begins, this is displayed by corresponding signals in the cabin and, additionally, a control signal is sent to the connected passenger devices from the data-processing unit via the on-board communication interface, by which means the software controls deactivating all active wireless components of the respective passenger device. Thus the connected passenger devices are controlled by the data-processing unit on the aircraft pursuant to the requirements of the aviation regulations, which releases the passenger from performing this operation and furthermore ensures the corresponding deactivation independently of influence from the passenger.

The software preferably controls transmitting payment data to the data-processing unit. Payment data can be, for example, account data for bank accounts and/or account data for credit accounts, e.g. of the airline, which are used for processing purchases of goods and services in the aircraft. Furthermore, controlling the transmission of payment data can also include controlling a near-field communication unit for transmitting payment data according to an NFC standard.

Furthermore, the object of the invention is achieved proceeding from the preamble of claim 10 in conjunction with the characterising features of said claim. A communication system for passengers in an aircraft with a data-processing unit on board the aircraft and at least one on-board communication interface for communicating with a passenger device are proposed. According to the invention, the communication system is designed to receive a passenger profile from the passenger device by means of the communication interface of the aircraft and to transmit said passenger profile to the data-processing unit.

Preferably, the communication system controls an in-flight entertainment system on the basis of a received passenger profile and/or makes passenger information available to the cabin crew. Alternatively or additionally, the communication system enables payment processes on the basis of a received passenger profile and/or provides advertising for the passenger and/or stores information for the airline.

The passenger profile can therefore advantageously tailor the pre-selection of the content offered in an in-flight entertainment system according to the passenger. Such tailoring can include language selection, genre of music, favourite films and/or preferred games. The contents of the passenger profiles can be displayed to the cabin crew, for example in the galley, and so an appropriate selection of food can be brought therefrom to the seats. This enables food to be served quickly and directly in the aircraft. Furthermore, if applicable, special requests indicated in the passenger profile can already be identified in the galley and be taken into consideration by the cabin crew. Furthermore, any requests from the passengers can be billed directly using the data from the passenger profile, and so the payment processes can be made efficient by means of the passenger profile. The data from the passenger profiles can, furthermore, be stored on the data-processing unit in a personalised or anonymised form for evaluation by the airline. If, for example, many passengers indicate that a specific meal was very tasty, this can be taken into consideration for selecting the menus for subsequent flights. Furthermore, advertising can be designed according to the details in the passenger profile.

In a preferred embodiment, the communication system has at least one near-field communication interface in the aircraft. Near-field communication is also known as NFC and is a transmission standard known as Near Field Communication (NFC) which is designed for contactless exchange of data over distances of less than 5 cm. This enables a wireless connection of only one passenger device to a communication interface, which prevents interception of the contents transmitted by other passenger devices during wireless data transmission.

Preferably, a seat identifier can be transmitted to the data-processing unit with the passenger profile, wherein the seat identifier is assigned to a seat in the aircraft. The seat identifier includes the designation and/or location of a specific seat in the cabin, wherein the seat identifier of the seat on which the respective passenger is sitting is transmitted.

Furthermore, the object of the invention is achieved proceeding from the preamble of claim 14 in conjunction with the characterising features of said claim. In a communication method in an aircraft with a data-processing unit on board the aircraft and at least one passenger device in the aircraft, the passenger device transmits a passenger profile according is to the invention to the data-processing unit via a near-field communication interface of the aircraft and a seat identifier of a seat in the aircraft is assigned to the passenger profile by the data-processing unit and/or the near-field communication interface, wherein the passenger profile in conjunction with the seat identifier controls an in-flight entertainment system of the aircraft.

Linking the seat identifier to the passenger profile is advantageous for the use of the passenger profile, since many services are provided on a per-seat basis or the seat enables a simple and fast assignment to the corresponding passenger. For example, specific content on an in-flight entertainment system can be unlocked on a per-seat basis with an associated screen at that seat. The use of a near-field communication interface as the on-board communication interface at a specific seat in particular enables the passenger profile to be transmitted with a seat identifier in a simple way if each near-field communication interface is associated with a specific seat. Furthermore, the content from the in-flight entertainment system can be transmitted to the passenger device via the corresponding communication interface at a seat, wherein the near-field communication interface enables a direct physical association, whereby the in-flight entertainment system is controlled on a per-seat basis.

Preferably, in the communication method with the communication system described above, a safety signal is transmitted from the data-processing unit to the passenger device, wherein the passenger device deactivates wireless transmitters associated therewith. Deactivating the wireless transmitters enables safe flight operations in the presence of passenger devices pursuant to the requirements of aviation regulations, in particular in the critical take-off, landing and taxiing phases of the flight.

The invention is explained below on the basis of preferred embodiments with reference to the appended drawings. In the drawings.

Figure 1:
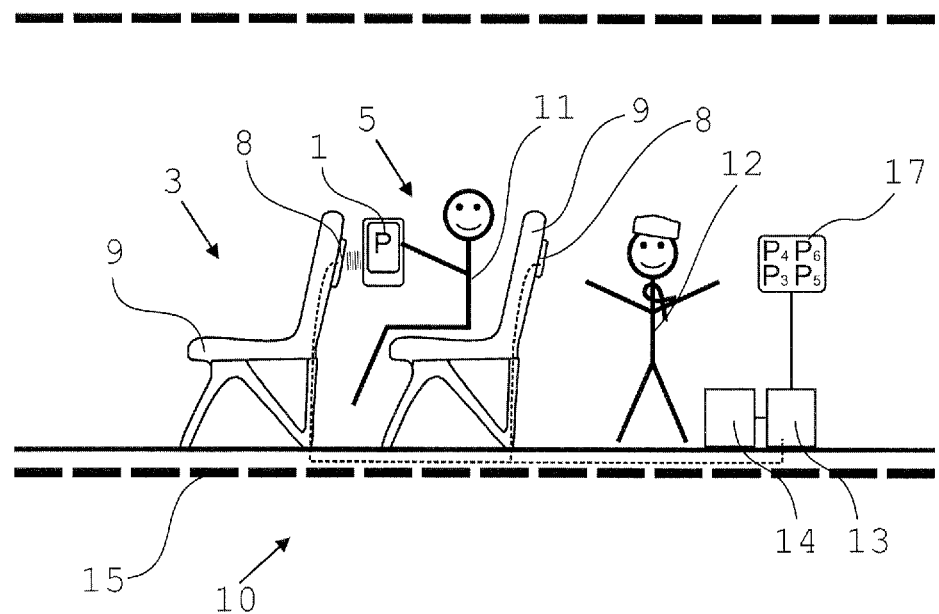
FIG. 1 shows a schematic representation of a communication system.

FIG. 1 shows an embodiment of a communication system 10 for passengers 11 in an aircraft 15. The aircraft 15 has a data-processing unit 13 on board the aircraft which is connected to communication interfaces 8, which are on-board in this advantageous embodiment, on each aircraft seat 9. The on-board communication interface 8 is advantageously arranged on the rear of an aircraft seat 9, and so this can be used by the passenger 11 sitting on the aircraft seat 9 therebehind. Furthermore, the data-processing unit 13 has a connection to an in-flight entertainment system 14.

In one possible use, the passenger 11 brings a mobile passenger device 1, for example a smartphone, with him/her on the journey in the aircraft 15. In a possible embodiment, the passenger 11 has installed the software for creating and editing his/her passenger profile on this mobile passenger device 1 before the journey. In an alternative embodiment, the passenger profile can be created, edited and/or stored without installing the software on the passenger device 1. This can be achieved, for example, via the homepage of the airline.

The passenger 11 creates his/her passenger profile and brings the passenger device 1 with him/her on board the aircraft 15. After the passenger 11 has taken his/her seat 5 on an aircraft seat 9 behind the further seat 3, the passenger 11 connects his/her mobile passenger device 1 to the on-board communication interface 8. This connection can be established for example to the communication interface on aircraft seat 9 using a data cable, e.g. according to the USD standard, or by means of establishing a connection to a wireless network (WLAN) of the aircraft 15, wherein, in the case of a wireless network, the communication interface 8 typically is not installed at every aircraft seat 9 and is instead installed for a larger region in the cabin of the aircraft 15. In a preferred embodiment, the communication interface 8 comprises a near-field communication interface. The passenger 11 brings his/her passenger device 1 into direct proximity to the near-field communication interface, preferably less than 10 cm, in order to connect said passenger device to the on-board communication interface 8. The passenger device 1 likewise has a near-field communication unit for this purpose.

The software on the passenger device 1 detects the connection of the passenger device 1 to the communication interface 8 of the aircraft 15 of the corresponding airline in an advantageous way and retrieves the passenger profile from a memory of the passenger device 1, which passenger profile is automatically transmitted to the data-processing unit 13 via the on-board communication interface 8.

Furthermore, after identifying the connection of the passenger device 1 to the on-board communication interface 8, a user interface is displayed which, for example, can include the profile data.

A seat identifier, e.g. of the seat 5, can preferably be transmitted to the data-processing unit 13 with the passenger profile. The seat identifier can, for example, be stored on a communication interface 8 with a near-field communication interface, which is in each case associated with a seat 3, 5, 6. In this way, the passenger profile of the passenger 11 in this example can be associated with the seat 5 in the data-processing unit 13 in a simple way.

The passenger 11 can now, for example, modify an entry in his/her passenger profile which is stored in the passenger device 1. Such a modification can be, for example, that the passenger 11 prefers to drink tomato juice rather than apple juice during a flight. The passenger device 1 identifies the modification to the passenger profile by means of the software and transmits this modification to the data-processing unit 13 of the aircraft 15. Alternatively, the passenger 11 can first be requested to transmit this modification by the passenger device 1.

In this embodiment, the aircraft 15 is shortly before take-off and the crew requests the passengers 11 to deactivate their electronic passenger devices 1 via an announcement and corresponding indicators in the cabin of the aircraft 15. In addition to a possible illumination of a corresponding indicator in the cabin, a control signal is sent to all passenger devices 1, connected via the communication interfaces 8, by the data-processing unit 13. The passenger device 1 can identify this signal with the aid of the software and thereupon deactivates all wireless units of the passenger device 1, also known as airplane mode, or switches off the passenger device 1 itself, and so the passenger 11 no longer needs to carry out this action him/herself.

In the embodiment, the aircraft 15 reaches cruising flight and the passenger 11 can reactivate and use his/her passenger device 1 after the corresponding indicators in the cabin are extinguished.

In this embodiment, the cabin crew 12 can begin in-flight services and may offer a drink to the passenger 11. The passenger profile of the passenger 11 is stored on the data-processing unit 13 of the aircraft 15 which displays this passenger profile or parts thereof on a staff screen 17, e.g. in the galley. The cabin crew 12 can thus see in the galley that the passenger 11 who, corresponding to the transmitted seat identifier, is sitting in the seat 5 likes to drink tomato juice, and the cabin cabin crew can prepare this in the galley and then serve it immediately.

Furthermore, the passenger 11 has indicated in his/her passenger profile that he/she only speaks English, and so the cabin crew 12 can accordingly address him/her in English. In an advantageous embodiment, the information stored in the passenger profile, for example the language, controls an in-flight entertainment system 14 which offers various media offerings to the passenger 11.

Figure 2:
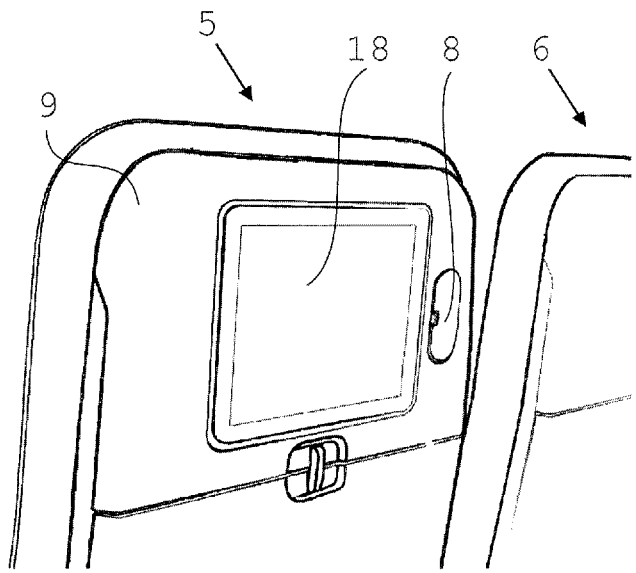
FIG. 2 shows a near-field communication interface on an aircraft seat.

In FIG. 2, the seat 5 is shown alongside a seat 6 of the passenger 11. A screen 18 of the in-flight entertainment system 14 is arranged to the left of the communication interface 8 with the near-field communication interface. The media offerings from the in-flight entertainment system 14, such as e.g. films, games, television or websites, are displayed on the screen 18. Selections are typically made via menus which, like the content, are available in various languages. In this embodiment, the passenger profile can control the in-flight entertainment system 14 at the seat 5 in such a way that the content is offered to the passenger 11 directly in the language indicated in the passenger profile, in English in this embodiment. In addition, it is possible to provide advertising information in respect thereof to the passenger 11 corresponding to his/her passenger profile.

Furthermore, in a possible embodiment, payment data can be transmitted to the data-processing unit 13 of the aircraft 15 with the passenger profile. The payment data can be account information for a bank account or e.g. credit information for a credit account with the airline, which enable billing for possible services provided by the cabin crew 12, purchase of items in the aircraft 15 or the use of specific offerings from the in-flight entertainment system 14, such as internet access in the aircraft 15.

In a possible embodiment, the payment data and/or the passenger profile can be synchronised via an external communication unit of the aircraft 15, and so it is possible to verify the passenger profile and/or the payment data in the data-processing unit 13.

Transmitting payment data by means of near-field communication (NFC) for carrying out a payment process is advantageous, since known and secure transmission standards can be used.

In a further possible embodiment, the passenger profile can be stored on a database on the ground, and so the data from the passenger profile for the passenger 11 can be retrieved or is loaded worldwide from any passenger device 1, for example via an external data connection, and so the communication system 10 can be used with various passenger devices 1 for the passenger 11.

However, the database on the ground is not necessary for operating the communication system 10 or for using the communication method, which is particularly advantageous, for example in the case of a failure of the external data connection to the aircraft 15, since the communication system 10 in the aircraft 15 can also function independently thereof with the passenger devices 1.

The invention claimed is:

1. A communication system for passengers in an aircraft having a data-processing unit on board the aircraft, comprising:
  a plurality of on-board communication interfaces,
  wherein each on-board communication interface of the plurality of on-board communication interfaces is configured to be positioned with respect to a corresponding seat of a corresponding plurality of seats, of a passenger of a corresponding plurality of passengers,
  wherein a corresponding plurality of seat identifiers is assigned to the plurality of seats,
  wherein each on-board communication interface of the plurality of on-board communication interfaces has the corresponding seat identifier of the plurality of seat identifiers, that is assigned to the corresponding seat of the plurality of seats, stored thereon,
  wherein each on-board communication interface of the plurality of on-board communication interfaces comprises a corresponding near-field communication interface of a corresponding plurality of near-field communication interfaces,
  wherein each on-board communication interface of the plurality of on-board communication interfaces is configured to communicate with a corresponding passenger device of a corresponding plurality of passenger devices, of a passenger in the corresponding seat of the plurality of seats, each passenger device of the plurality of passenger devices having a corresponding passenger profile of a corresponding plurality of passenger profiles stored thereon, via the corresponding near-field communication interface of the plurality of near-field communication interfaces, and receive the corresponding passenger profile, and a corresponding passenger payment data according to an NFC (near field communication) standard, from the corresponding passenger device, while not communicating with other passenger devices of the plurality of passenger devices of other passengers in other seats of the plurality of seats, and
  wherein the communication system is configured, such that when:
    (i) the plurality of on-board communication interfaces is on board an aircraft having:
      an external communication unit is on board the aircraft;
      a data-processing unit on board the aircraft; and
      a corresponding plurality of seats of a corresponding plurality of passengers on board the aircraft;
    (ii) each on-board communication interface of the plurality of on-board communication interfaces is connected to the data processing unit;
    (iii) each on-board communication interface of the plurality of on-board communication interfaces is positioned with respect to the corresponding seat of the plurality of seats, such that the corresponding seat identifier of the plurality of seat identifiers stored thereon is assigned to the seat of the plurality of seats the on-board communication interface of the plurality of on-board communication interfaces is positioned with respect to; and
    (iv) a first on-board communication interface of the plurality of on-board communication interfaces receives a first passenger profile, and a first passenger payment data according to an NFC (near field communication) standard, from the first passenger device via the first near-field communication interface of the plurality of near-field communication interfaces,
  the first on-board communication interface of the plurality of on-board communication interfaces transmits the first passenger profile, the first passenger payment data, and the first seat identifier of the plurality of seat identifiers to the data-processing unit; and
    the first passenger profile and the first passenger payment data are synchronized via the external communication unit and the first passenger profile and/or the first passenger payment data is verified in the data-processing unit.

2. The communication system according to claim 1, further comprising:
The external communication unit; and
the data-processing unit,
wherein, when the data-processing unit receives the first passenger profile and the first seat identifier of the plurality of seat identifiers from the first on-board communication interface of the plurality of on-board communication interfaces, on the basis of the first passenger profile and the first seat identifier of the plurality of seat identifiers received from the first on-board communication interface of the plurality of on-board communication interfaces, the communication system:
controls an in-flight entertainment system on board the aircraft;
makes first passenger information associated with the first passenger profile available to a cabin crew on board the aircraft;
enables payment processes;
provides advertising to the first passenger corresponding to the first passenger profile; or
stores information for an airline.

3. The communication system according to claim 1, wherein each near-field communication interface of the plurality of near-field communication interfaces only communicates with the corresponding passenger device of the plurality of passenger devices when the corresponding passenger device of the plurality of passenger devices is within 10 cm of the near-field communication interface of the plurality of near-field communication interfaces.

4. A method of communication in an aircraft, comprising:
providing a data-processing unit on board an aircraft;
providing an external communication unit on board the aircraft;
providing a plurality of seats of a corresponding plurality of passengers on board the aircraft;
providing a communication system, for the plurality of passengers in the aircraft, on board the aircraft,
wherein the communication system comprises:
a corresponding plurality of on-board communication interfaces,
wherein each on-board communication interface of the plurality of on-board communication interfaces has a corresponding seat identifier of a corresponding plurality of seat identifiers stored thereon,
wherein each on-board communication interface of the plurality of on-board communication interfaces comprises a corresponding near-field communication interface of a corresponding plurality of near-field communication interfaces,
wherein each on-board communication interface of the plurality of on-board communication interfaces is configured to communicate with a corresponding passenger device of a plurality of passenger devices, of a passenger in the corresponding seat of the plurality of seats, having a corresponding passenger profile of a plurality of passenger profiles stored thereon, via the corresponding near-field communication interface of the plurality of near-field communication interfaces, and receive the corresponding passenger profile of the plurality of passenger profiles, and a corresponding passenger payment data according to an NFC (near field communication) standard, from the corresponding passenger device of the plurality of passenger devices, while not communicating with other passenger devices of the plurality of passenger devices of other passengers in other seats of the plurality of seats, and
wherein the communication system is configured, such that when:
(i) each on-board communication interface of the plurality of on-board communication interfaces is connected to the data processing unit;
(ii) each on-board communication interface of the plurality of on-board communication interfaces is positioned with respect to the corresponding seat of the plurality of seats, such that the corresponding seat identifier of the plurality of seat identifiers stored thereon is assigned to the seat of the plurality of seats the on-board communication interface of the plurality of on-board communication interfaces is positioned with respect to; and
(iii) a first on-board communication interface of the plurality of on-board communication interfaces receives a first passenger profile, and a first passenger payment data according to an NFC (near field communication) standard, from the first passenger device via the first near-field communication interface of the plurality of near-field communication interfaces,
the first on-board communication interface of the plurality of on-board communication interfaces transmits the first passenger profile, the first passenger payment data, and the first seat identifier of the plurality of seat identifiers to the data-processing unit;
connecting each on-board communication interface of the plurality of on-board communication interfaces to the data processing unit;
positioning each on-board communication interface of the plurality of on-board communication interfaces with respect to the corresponding seat of the plurality of seats, such that the corresponding seat identifier of the plurality of seat identifiers identifies the seat of the plurality of seats the on-board communication interface of the plurality of on-board communication interfaces is positioned with respect to;
receiving via a first on-board communication interface of the plurality of on-board communication interfaces, via the corresponding near-field communication interface of the plurality of near-field communication interfaces, the first passenger profile, and the first passenger payment data according to an NFC (near field communication) standard, from the passenger device;
transmitting, via the first on-board communication interface of the plurality of on-board communication interfaces, the first passenger profile, the first passenger payment data, and the first seat identifier of the plurality of seat identifiers to the data-processing unit;
synchronizing the first passenger profile and the first passenger payment data via the external communication unit;
verifying the first passenger profile and/or the first passenger payment data via the data-processing unit;
receiving, via the data-processing unit, the first passenger profile, the first passenger payment data, and the first seat identifier of the plurality of seat identifiers;
assigning the first seat identifier of the plurality of seat identifiers to the first passenger profile by:
(i) the data-processing unit;

(ii) the first near-field communication interface of the plurality of near-field communication interfaces; or
(iii) the data-processing unit and the first near-field communication interface; and
controlling, on the basis of the first passenger profile and the first seat identifier of the plurality of seat identifiers, an in-flight entertainment system on board the aircraft.

5. The communication method according to claim 4, wherein the data-processing unit transmits a safety signal to the first passenger device, such that when the first passenger device receives the safety signal, the first passenger device deactivates wireless transmitters associated therewith.

6. The communication method according to claim 4, further comprising:
providing the corresponding plurality of passenger devices on board the aircraft,
wherein the plurality of passenger devices has the corresponding plurality of passenger profiles stored thereon; and
transmitting the first passenger profile, via the first passenger device, to the first on-board communication interface of the plurality of on-board communication interfaces, via the first near-field communication interface of the plurality of near-field communication interfaces.

7. The communication system according to claim 1, further comprising:
the first passenger device and a set of instructions stored on the first passenger device, that when executed cause a computer to perform a method,
wherein the method comprises:
controlling the first passenger device such that the first passenger device performs the following:
transmitting the first passenger profile from the first passenger device to the data-processing unit via the first on-board communication interface of the plurality of on-board communication interfaces.

8. The communication system according to claim 7, wherein the first passenger device further performs:
retrieving the first passenger profile from a memory of the first passenger device.

9. The communication system according to claim 7, wherein the method further comprises:
retrieving the first passenger profile from a database on the ground; and
transmitting the first passenger profile into the first passenger device.

10. The communication system according to claim 7, wherein the method further comprises:
modifying the first passenger profile to create a modified first passenger profile.

11. The communication system according to claim 10, wherein the method further comprises:
requesting or initiating a transmission of the modified first passenger profile to the data-processing unit when the first passenger profile is modified.

12. The communication system according to claim 7, wherein the first passenger device further performs:
identifying a procedure for connecting the first passenger device to the first on-board communication interface of the plurality of on-board communication interfaces; and
automatically transmitting the first passenger profile to the data-processing unit via the first on-board communication interface of the plurality of on-board communication interfaces after identifying the procedure for connecting to the first on-board communication interface of the plurality of on-board communication interfaces.

13. The communication system according to claim 12, wherein the method further comprises:
controlling the first passenger device after identifying the first on-board communication interfaces of the plurality of on-board communication interfaces in order to display a specific graphical user interface on the first passenger device.

14. The communication system according to claim 12, wherein the first passenger device further performs:
receiving a control signal from the data-processing unit; and
switching off all wireless transmitters of the first passenger device as a result of receiving the control signal.

15. The communication system according to claim 12, wherein the method further comprises:
transmitting payment data to the data-processing unit.

16. The method according to claim 4, wherein each near-field communication interface of the plurality of near-field communication interfaces only communicates with the corresponding passenger device of the plurality of passenger devices when the corresponding passenger device of the plurality of passenger devices is within 10 cm of the near-field communication interface of the plurality of near-field communication interfaces.

17. An aircraft, comprising:
a data-processing unit;
an external communication unit;
a plurality of seats of a plurality of passengers; and
a communication system for the plurality of passengers on-board the aircraft,
wherein the communication system comprises:
a corresponding plurality of on-board communication interfaces,
wherein each on-board communication interface of the plurality of on-board communication interfaces has a corresponding seat identifier of a corresponding plurality of seat identifiers stored thereon,
wherein each on-board communication interface of the plurality of on-board communication interfaces comprises a corresponding near-field communication interface of a corresponding plurality of near-field communication interfaces,
wherein each on-board communication interface of the plurality of on-board communication interfaces is configured to communicate with a corresponding passenger device of the plurality of passenger devices, of a passenger in the corresponding seat of the plurality of seats, having a corresponding passenger profile thereon, via the corresponding near-field communication interface of the plurality of near-field communication interfaces, and receive the corresponding passenger profile, and a corresponding passenger payment data according to an NFC (near field communication) standard, from the corresponding passenger device, while not communicating with other passenger devices of the plurality of passenger devices of other passengers in other seats of the plurality of seats, and
wherein the communication system is configured, such that when:

(i) each on-board communication interface of the plurality of on-board communication interfaces is connected to the data processing unit;

(ii) each on-board communication interface of the plurality of on-board communication interfaces is positioned with respect to the corresponding seat of the plurality of seats, such that the seat identifier of the plurality of seat identifiers stored thereon is assigned to the seat of the plurality of seats the on-board communication interface of the plurality of on-board communication interfaces is positioned with respect to; and (iii) a first on-board communication interface of the plurality of on-board communication interfaces receives a first passenger profile, and a first passenger payment data according to an NFC (near field communication) standard, from a first passenger device via the first near-field communication interface of the plurality of near-field communication interfaces, the first on-board communication interface of the plurality of on-board communication interfaces transmits the first passenger profile, the first passenger payment data, and the first seat identifier of the plurality of seat identifiers to the data-processing unit; and the first passenger profile and the first passenger payment data are synchronized via the external communication unit and the first passenger profile and/or first passenger payment data is verified in the data-processing unit, wherein each on-board communication interface of the plurality of on-board communication interfaces is connected to the data processing unit, and wherein each on-board communication interface of the plurality of on-board communication interfaces is positioned with respect to a corresponding seat of the plurality of seats, such that the corresponding seat identifier of the plurality of seat identifiers stored thereon is assigned to the seat of the plurality of seats the on-board communication interface of the plurality of on-board communication interfaces is positioned with respect to.

18. The aircraft according to claim 17, wherein each near-field communication interface of the plurality of near-field communication interfaces only communicates with the corresponding passenger device of the plurality of passenger devices when the corresponding passenger device of the plurality of passenger devices is within 10 cm of the near-field communication interface of the plurality of near-field communication interfaces.

* * * * *